United States Patent
Okamoto

(10) Patent No.: US 9,525,596 B2
(45) Date of Patent: Dec. 20, 2016

(54) INFORMATION PROCESSING APPARATUS AND METHOD, AND NON-TRANSITORY COMPUTER READABLE MEDIUM

(71) Applicant: FUJI XEROX CO., LTD., Minato-ku, Tokyo (JP)

(72) Inventor: Akira Okamoto, Yokohama (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 799 days.

(21) Appl. No.: 13/896,837

(22) Filed: May 17, 2013

(65) Prior Publication Data
US 2014/0122667 A1    May 1, 2014

(30) Foreign Application Priority Data
Oct. 30, 2012  (JP) ................. 2012-239351

(51) Int. Cl.
*G06F 15/177* (2006.01)
*H04L 12/24* (2006.01)
*H04L 12/28* (2006.01)

(52) U.S. Cl.
CPC ....... *H04L 41/0846* (2013.01); *H04L 12/2869* (2013.01)

(58) Field of Classification Search
CPC  G06F 11/0733; G06F 15/00; G06F 17/30017; G06F 17/30047; H04L 12/40123
USPC ....................................................... 709/220
See application file for complete search history.

(56) References Cited

U.S. PATENT DOCUMENTS

| | | | | |
|---|---|---|---|---|
| 8,312,660 | B1* | 11/2012 | Fujisaki | F41A 17/08 42/70.01 |
| 8,676,273 | B1* | 3/2014 | Fujisaki | H04M 1/6505 379/142.06 |
| 2013/0059527 | A1* | 3/2013 | Hasesaka | H04L 12/66 455/7 |
| 2015/0312354 | A1* | 10/2015 | Boyle | H04N 21/21805 709/219 |

FOREIGN PATENT DOCUMENTS

| | | |
|---|---|---|
| JP | 2010-154086 A | 7/2010 |
| JP | 2011-118664 A | 6/2011 |
| WO | 2011/111105 A1 | 9/2011 |

OTHER PUBLICATIONS

Communication dated Jan. 26, 2016 from the Japanese Patent Office issued in corresponding Application No. 2012-239351.

* cited by examiner

*Primary Examiner* — Khanh Dinh
*Assistant Examiner* — Sm Rahman
(74) *Attorney, Agent, or Firm* — Sughrue Mion, PLLC

(57) ABSTRACT

An information processing apparatus includes a physical interface, a memory, and a communication controller. The physical interface communicates with any of multiple types of networks. The memory stores network setting information corresponding to each of the multiple types of networks. The communication controller controls, when information unique to a particular type of network, among the multiple types of networks, is obtained via the physical interface, communication of the physical interface on the basis of the network setting information corresponding to the particular type of network.

8 Claims, 4 Drawing Sheets

FIG. 4

| NETWORK SETTING INFORMATION | SETTING DETAILS |
|---|---|
| NETWORK SETTING INFORMATION FOR NGN | DHCP<br><br>SIP FAX INFORMATION<br>:<br>:<br>: |
| NETWORK SETTING INFORMATION FOR NORMAL IP NETWORK | DHCP<br>:<br>:<br>:<br>:<br>:<br>: |
| :<br>:<br>: | :<br>:<br>: |

INFORMATION PROCESSING APPARATUS AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-239351 filed Oct. 30, 2012.

BACKGROUND

Technical Field

The present invention relates to an information processing apparatus and method and to a non-transitory computer readable medium.

SUMMARY

According to an aspect of the invention, there is provided an information processing apparatus including a physical interface, a memory, and a communication controller. The physical interface communicates with any of multiple types of networks. The memory stores network setting information corresponding to each of the multiple types of networks. The communication controller controls, when information unique to a particular type of network, among the multiple types of networks, is obtained via the physical interface, communication of the physical interface on the basis of the network setting information corresponding to the particular type of network.

BRIEF DESCRIPTION OF THE DRAWINGS

An exemplary embodiment of the present invention will be described in detail based on the following figures, wherein:

FIG. 4 is a diagram illustrating exemplary details stored in a setting information memory.

DETAILED DESCRIPTION

An exemplary embodiment of the invention (hereinafter referred to as an "exemplary embodiment") will be described in accordance with the drawings. In the exemplary embodiment, the case in which an information processing apparatus according to the exemplary embodiment is applied to an image forming apparatus will be described by way of example. The information processing apparatus may be realized with a computer such as a personal computer.

1. Hardware Configuration of Image Forming Apparatus

Figure 1:
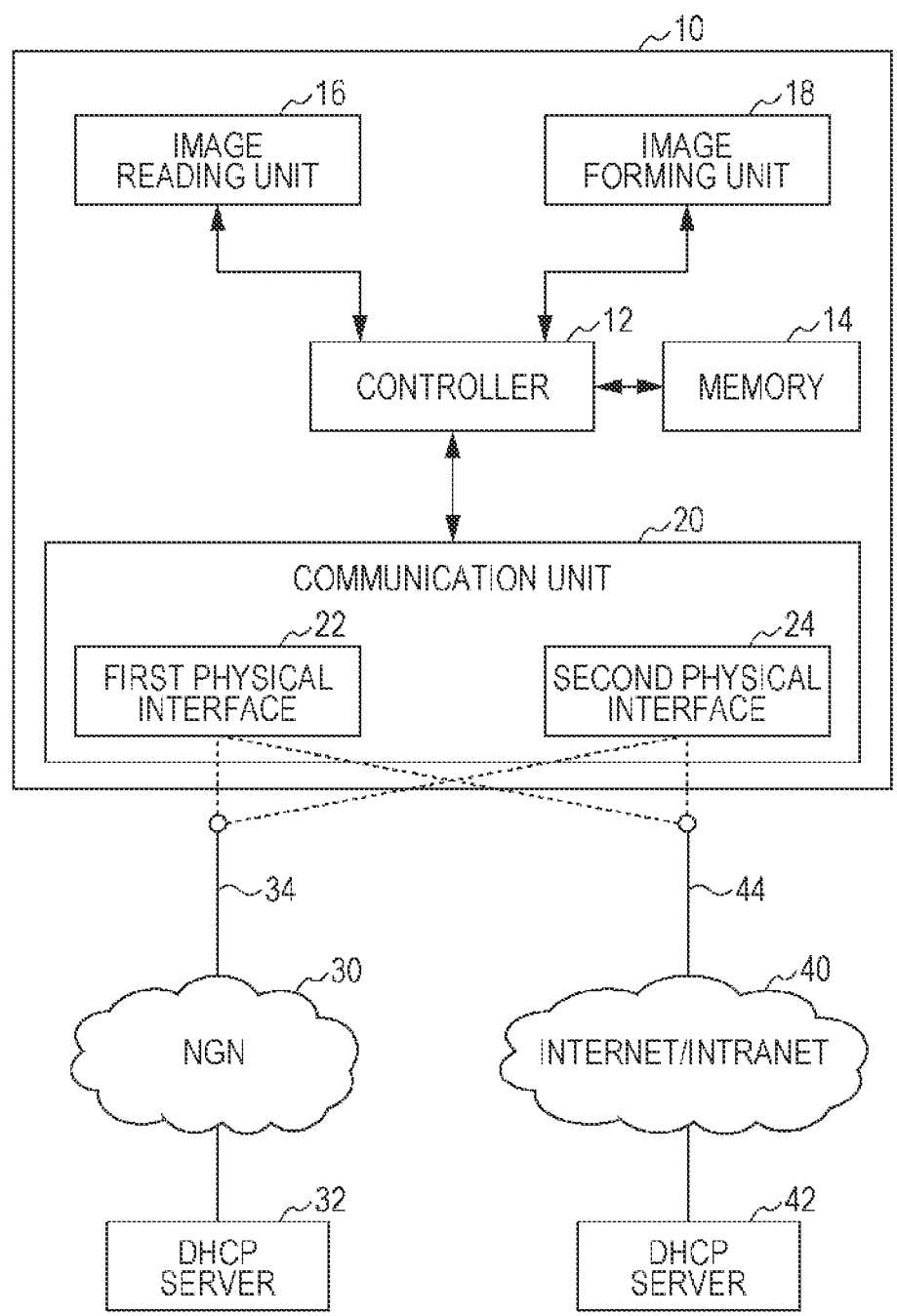
FIG. 1 is a diagram illustrating the hardware configuration of an image forming apparatus according to an exemplary embodiment of the invention.

FIG. 1 is a diagram illustrating the hardware configuration of an image forming apparatus according to the exemplary embodiment. As illustrated in FIG. 1, an image forming apparatus 10 includes a controller 12, a memory 14, an image reading unit 16, an image forming unit 18, and a communication unit 20. The image forming apparatus 10 may further include an operation unit, a display, a power switch, and the like, besides the configuration illustrated in FIG. 1.

The controller 12 includes a central processing unit (CPU). The controller 12 executes a program stored in the memory 14 and controls each unit of the image forming apparatus 10.

The memory 14 includes various memories such as a hard disk and a random-access memory (RAM). The memory 14 is a storage medium that stores the program executed by the controller 12. Additionally, the memory 14 is also used as, for example, a work memory for the controller 12. Various memories are applicable as the memory 14. For example, the memory 14 may be realized with a storage device such as a semiconductor memory.

Alternatively, the program and various types of data described as being stored in the memory 14 in the exemplary embodiment may be obtained from an external device via the communication unit 20, or may be obtained from an external storage medium.

The image reading unit 16 includes a scanner or the like. By optically scanning an object to be scanned, such as a sheet, the image reading unit 16 generates an image of the object. The image forming unit 18 includes a printer or the like. On the basis of image data obtained from the image reading unit 16 or the communication unit 20, the image forming unit 18 forms an image on a recording medium (such as a sheet or a film).

The communication unit 20 includes a network interface card (NIC) or the like. The communication unit 20 performs wired or wireless data communication with an external device connected to the image forming apparatus 10. In the exemplary embodiment, the communication unit 20 includes multiple physical interfaces. Here, the case in which the communication unit 20 includes two physical interfaces (a first physical interface 22 and a second physical interface 24) will be described by way of example. However, the number of physical interfaces included in the communication unit 20 may be an arbitrary number.

The first physical interface 22 and the second physical interface 24 include connectors with a certain shape (slots for cables 34 and 44) and communicate with any of multiple types of networks. In the exemplary embodiment, as an example of the multiple types of networks, a next generation network (NGN) 30 and the Internet or an intranet (hereinafter may simply be referred to as a "normal internet protocol (IP) network 40") will be described.

As illustrated in FIG. 1, the NGN 30 includes a dynamic host configuration protocol (DHCP) server 32 set for NGN. For example, in response to a request from a computer, the DHCP server 32 replies with an IP address in the Internet Protocol version 6 (IPv6) format. In contrast, the normal IP network 40 includes a DHCP server 42 set for the Internet or an intranet. For example, in response to a request from a computer, the DHCP server 42 replies with an IP address in the Internet Protocol version 4 (IPv4) format.

Figure 2:
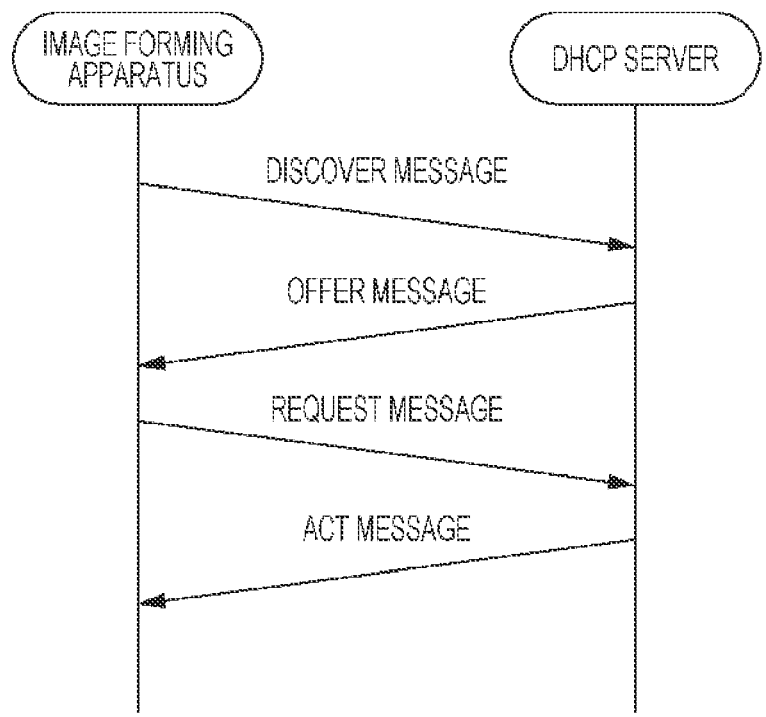
FIG. 2 is a sequence diagram until an IP address is assigned to the image forming apparatus.

FIG. 2 is a sequence diagram until an IP address is assigned to the image forming apparatus 10. Here, the flow of a process in the case where the cable 34 is inserted into the connector of the first physical interface 22 will be described. As illustrated in FIG. 2, when the cable 34 is inserted into the connector of the first physical interface 22, the image forming apparatus 10 broadcasts a discover message to the entire NGN 30 (to the broadcast address) in the same segment as the image forming apparatus 10. The discover message includes the media access control (MAC) address of the first physical interface 22.

Upon receipt of the discover message, the DHCP server 32 sends an offer message to the image forming apparatus 10. The offer message includes information of IP addresses usable by the image forming apparatus 10 (IP addresses that are not leased to other computers) and vendor unique information. The DHCP server 32 presents leasable IP addresses to the image forming apparatus 10.

Upon receipt of the offer message, the image forming apparatus 10 obtains the IP addresses included in the offer message. When multiple offer messages are received, the image forming apparatus 10 obtains the IP addresses included in the first received offer message. The image forming apparatus 10 sends a request message including the obtained IP addresses to the DHCP server 32.

Upon receipt of the request message, the DHCP server 32 assigns an IP address to the image forming apparatus 10 in accordance with the details of the request message. The DHCP server 32 controls the IP address assigned to the image forming apparatus 10 to be unusable by other computers. The DHCP server 32 sends, to the image forming apparatus 10, an act message indicating that the IP address is formally assigned. Upon receipt of the act message, the image forming apparatus 10 executes a process of setting the IP address in accordance with the details of the act message and controls communication thereafter.

The flow of a process in the case where the cable 44 is inserted into the connector of the second physical interface 24 is the same as the above process. It is only necessary to replace the description "first physical interface 22" with "second physical interface 24", the description "NGN 30" with "normal IP network 40", and the description "DHCP server 32" with "DHCP server 42". The same process as the above process is executed when the cable 44 is inserted into the connector of the first physical interface 22 and when the cable 34 is inserted into the connector of the second physical interface 24.

Here, it is assumed that the first physical interface 22 and the second physical interface 24 include NICs whose types correspond to each other (such as NICs with the same communication standard), and have connectors (slots) with the same shape. Therefore, the cable 34 and the cable 44 may be inserted into either the first physical interface 22 or the second physical interface 24.

For example, when a user disconnects the cables 34 and 44 from the image forming apparatus 10 and reinserts the cables 34 and 44 into the first physical interface 22 and the second physical interface 24, the cables 34 and 44 may be inserted into connectors different from those into which the cables 34 and 44 were originally inserted. More specifically, when the cable 44 is inserted to the connector of the first physical interface 22 although the first physical interface 22 is set for the NGN 30, no normal communication is performed. Similarly, when the cable 34 is inserted into the connector of the second physical interface 24 although the second physical interface 24 is set for the normal IP network 40, no normal communication is performed.

In the exemplary embodiment, in response to such a wrong connection, network setting information corresponding to the type of a currently connected network is automatically assigned to each physical interface. This configuration will be described in detail hereinafter.

2. Functions Realized in Image Forming Apparatus

Figure 3:
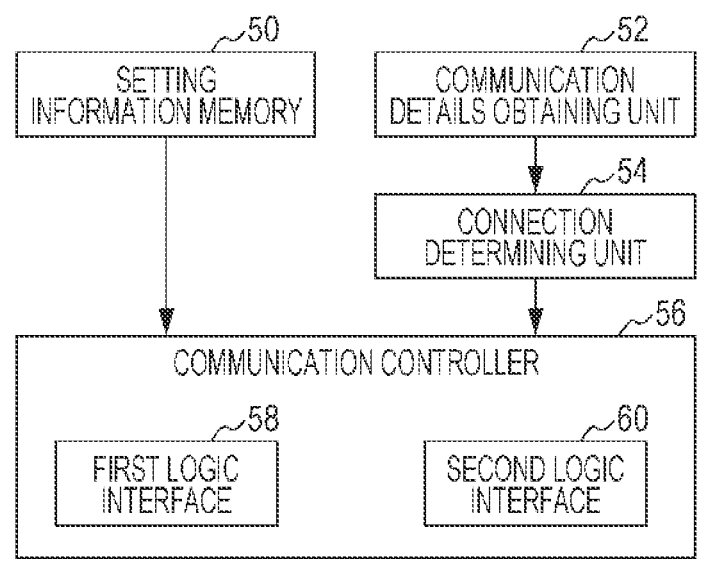
FIG. 3 is a functional block diagram of the image forming apparatus.

FIG. 3 is a functional block diagram of the image forming apparatus 10. As illustrated in FIG. 3, the image forming apparatus 10 includes a setting information memory 50, a communication details obtaining unit 52, a connection determining unit 54, and a communication controller 56. The functions illustrated in FIG. 3 are realized by executing, by the controller 12, the program stored in the memory 14. In the exemplary embodiment, among the functions illustrated in FIG. 3, the communication details obtaining unit 52, the connection determining unit 54, and the communication controller 56 are realized mostly by the controller 12, and the setting information memory 50 is realized mostly by the memory 14.

2-1. Setting Information Memory

The setting information memory 50 stores network setting information corresponding to each of multiple types of networks (such as the NGN 30 and the normal IP network 40). The network setting information is information set in the first physical interface 22 or the second physical interface 24. The network setting information is, for example, information indicating the presence of DHCP setting, information indicating whether to use IPv4 (whether to turn on/off IPv4), information indicating whether to use IPv6 (whether to turn on/off IPv6), and the like. Parameters included in the network setting information are set in advance by the user.

FIG. 4 is a diagram illustrating exemplary details stored in the setting information memory 50. As illustrated in FIG. 4, one or multiple pieces of network setting information are stored for each type of network. Here, network setting information for the NGN 30 and network setting information for the normal IP network 40 are stored in the setting information memory 50. The network setting information for the NGN 30 includes unique setting information that is not included in the network setting information for the normal IP network 40.

For example, session initiation protocol facsimile (SIP FAX) information corresponds to the unique setting information. The SIP FAX information is setting information in the T.38 protocol, which is a communication protocol used in SIP FAX. The SIP FAX information is, for example, a port number used in T.38 communication. Alternatively, for example, the IP address of a home gateway of the NGN 30 (corresponding to a broadband router of the NGN 30) may correspond to setting information unique to the NGN 30.

Any of the pieces of network setting information stored in the setting information memory 50 is set in each of the multiple physical interfaces included in the image forming apparatus 10 (here, the first physical interface 22 and the second physical interface 24). Associating (connecting) each of the first physical interface 22 and the second physical interface 24 with a first logic interface 58 or a second logic interface 60, which are described later, corresponds to setting network setting information in each of the first physical interface 22 and the second physical interface 24.

The first physical interface 22 and the second physical interface 24 perform communication on the basis of the network setting information set therein. For example, when DHCP is set in the network setting information, the first physical interface 22 and the second physical interface 24 broadcasts a discover message in response to detection of insertion of the cables 34 and 44 into the first physical interface 22 and the second physical interface 24.

2-2. Communication Details Obtaining Unit

The communication details obtaining unit 52 obtains the details of communication between the image forming apparatus 10 and another computer. Here, the communication details obtaining unit 52 obtains information (offer message and the like) sent by the DHCP servers 32 and 42.

2-3. Connection Determining Unit

On the basis of the result of obtaining performed by the communication details obtaining unit 52, the connection determining unit 54 determines (specifies) the type of network connected to the image forming apparatus 10. The connection determining unit 54 determines the type of network by determining whether the communication details obtaining unit 52 has obtained information unique to a particular type of network. Here, NGN unique information corresponds to information unique to a particular type of network.

The NGN unique information is information unique to NGN and, out of information sent by the DHCP server 32, information that is not sent by the DHCP server 42. For example, vendor information (vendor-identifying vendor specific information) of the NGN 30 corresponds to the NGN unique information. The vendor information includes a vendor identifier that identifies the provider of the NGN 30, and vendor definition information indicating setting information set by each provider. By determining whether the NGN unique information has been obtained, the connection determining unit 54 determines whether the image forming apparatus 10 and the NGN 30 are connected to each other, or whether the image forming apparatus 10 and the normal IP network 40 are connected to each other.

2-4. Communication Controller

When information unique to a particular type of network (such as the NGN 30) (such as the NGN unique information), among multiple types of networks (such as the NGN 30 and the normal IP network 40), is obtained via a physical interface (such as the first physical interface 22 or the second physical interface 24), the communication controller 56 controls communication of the physical interface on the basis of network setting information corresponding to the particular type of network.

When network setting information of the particular type of network (such as the NGN 30) is not set in the first physical interface 22 or the second physical interface 24, the above-described network setting information is set, instead of network setting information currently set in the first physical interface 22 or the second physical interface 24. The communication controller 56 changes the network setting information set in the first physical interface 22 or the second physical interface 24.

Here, when information unique to a particular network (such as the NGN 30) is obtained from the DHCP server 32 of the particular type of network, the communication controller 56 controls communication of a physical interface (such as the first physical interface 22 or the second physical interface 24) on the basis of network setting information corresponding to the particular type of network.

The communication controller 56 includes multiple logic interfaces (such as the first logic interface 58 and the second logic interface 60).

The first logic interface 58 is a logic interface for setting the network setting information for the NGN 30, and obtains the network setting information for the NGN 30. The first logic interface 58 controls communication of a physical interface on the basis of this network setting information.

In contrast, the second logic interface 60 is a logic interface for setting the network setting information for the normal IP network 40, and obtains the network setting information for the normal IP network 40. The second logic interface 60 controls communication of a physical interface on the basis of this network setting information.

In the exemplary embodiment, when information unique to a particular type of network (such as NGN unique information) is obtained via at least one of multiple physical interfaces (such as the first physical interface 22 and the second physical interface 24), the communication controller 56 controls the relationship between each of the physical interfaces and network setting information stored in a memory (such as the setting information memory 50).

The relationship between each of the first physical interface 22 and the second physical interface 24 and the network setting information is association (mapping) between each of the first physical interface 22 and the second physical interface 24 with one of the first logic interface 58 and the second logic interface 60. Controlling the relationship corresponds to switching (changing) the combination of a physical interface and a logic interface.

For example, when the first physical interface 22 is associated with the first logic interface 58 and when the second physical interface 24 is associated with the second logic interface 60, the communication controller 56 performs control to associate the second logic interface 60 with the first physical interface 22 and to associate the first logic interface 58 with the second physical interface 24.

Alternatively, when the first physical interface 22 is associated with the second logic interface 60 and when the second physical interface 24 is associated with the first logic interface 58, the communication controller 56 performs control to associate the first logic interface 58 with the first physical interface 22 and to associate the second logic interface 60 with the second physical interface 24.

3. Process Executed by Image Forming Apparatus

Figure 5:
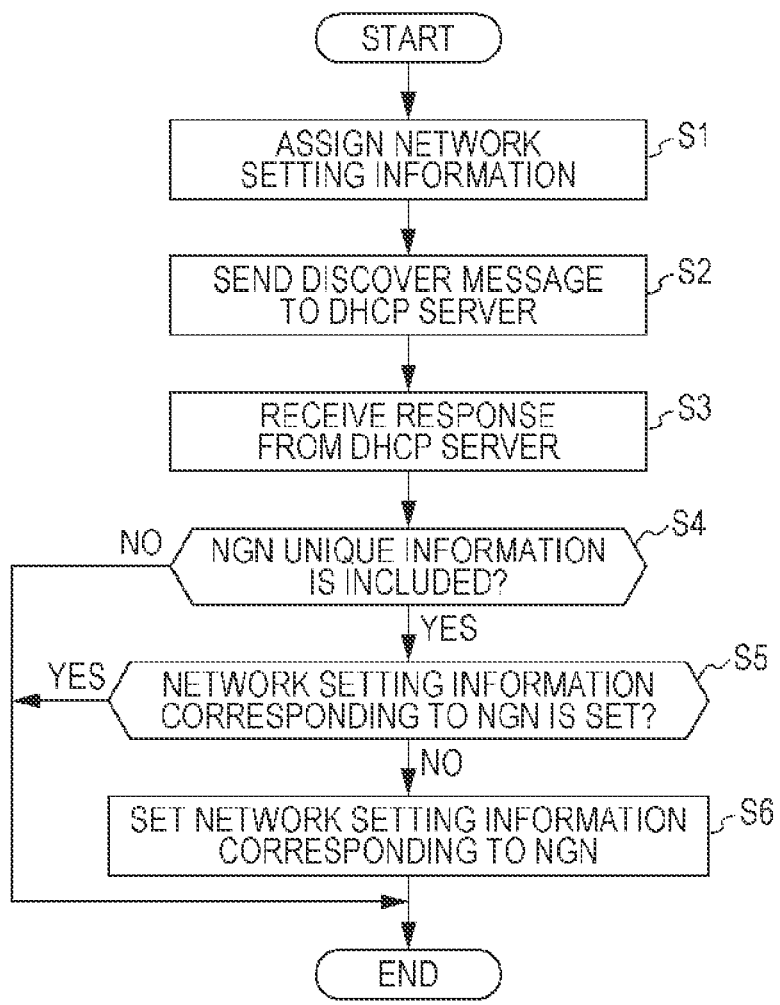
FIG. 5 is a flowchart illustrating a process executed by the image forming apparatus.

FIG. 5 is a flowchart illustrating a process executed by the image forming apparatus 10. In accordance with the program stored in the memory 14, the controller 12 executes the process illustrated in FIG. 5. In response to execution of the process illustrated in FIG. 5, the functions illustrated in FIG. 3 are realized in the image forming apparatus 10. Here, the case in which the following process is executed when the power switch of the image forming apparatus 10 is turned on will be described. It is also assumed that this process is executed in a state where the cables 34 and 44 are inserted into the first physical interface 22 and the second physical interface 24 either respectively or vice versa.

As illustrated in FIG. 5, on the basis of a default setting stored in the memory 14, the controller 12 assigns network setting information to the first physical interface 22 and the second physical interface 24 (S1). In step S1, the controller 12 determines the association between each of the first physical interface 22 and the second physical interface 24 with each piece of network setting information. That is, the controller 12 connects each of the first physical interface 22 and the second physical interface 24 with either of the first physical interface 22 and the second physical interface 24. It is assumed that the default setting is stored in advance in the memory 14. For example, the association at the time the power switch was previously turned off corresponds to the default setting.

On the basis of the default setting, the controller 12 sends a discover message to either of the DHCP server 32 and the DHCP server 42 via each of the first physical interface 22 and the second physical interface 24 (S2). In step S2, the discover message is broadcast.

The controller 12 receives a response from the DHCP server 32 or the DHCP server 42 (S3). Here, the controller 12 obtains an offer message from the DHCP server 32 and an offer message from the DHCP server 42. Either of these offer messages includes NGN unique information.

The controller 12 determines whether each of the offer messages obtained in step S3 includes NGN unique information (S4). In step S4, the controller 12 determines whether each of the offer messages includes vendor information of the NGN 30.

When it is determined that NGN unique information is included (S4; Y), the controller 12 determines whether network setting information corresponding to the NGN 30 is set in, out of the first physical interface 22 and the second physical interface 24, an interface that has received the NGN unique information (S5). In step S5, the controller 12 determines whether the first logic interface 58 is associated with, out of the first physical interface 22 and the second physical interface 24, an interface that has received the NGN unique information.

When it is determined that network setting information corresponding to the NGN 30 is not set (S5; N), the controller 12 sets network setting information corresponding to the NGN 30 in, out of the first physical interface 22 and the second physical interface 24, the interface which has received the NGN unique information (S6). In step S6, the controller 12 switches, from the default setting, the association of each of the first physical interface 22 and the second physical interface 24 with either of the first logic interface 58 and the second logic interface 60.

When it is determined that network setting information corresponding to the NGN 30 is set (S5; Y), the processing in step S6 is not executed, and this process is terminated.

The above-described image forming apparatus 10 performs communication using network setting information that fits the type of network connected to the image forming apparatus 10. Further, the image forming apparatus 10 controls the association between each physical interface and network setting information in accordance with the type of network connected to the physical interface. Also, the image forming apparatus 10 performs communication control in accordance with NGN. Further, the image forming apparatus 10 specifies the type of network on the basis of information obtained from a DHCP server.

4. Modifications

The exemplary embodiment of the invention is not limited to that described above and is appropriately changeable without departing from the scope thereof.

(1) For example, the exemplary embodiment has described the case in which whether the image forming apparatus 10 is connected to the NGN 30 is determined on the basis of the details of a response from the DHCP server 32. However, the method of determining whether the image forming apparatus 10 is connected to the NGN 30 is not limited to that described above. Whether the image forming apparatus 10 is connected to the NGN 30 may be determined on the basis of unique information obtained form a communication device connected to the NGN 30.

For example, when the first physical interface 22 and the second physical interface 24 perform communication based on the Hypertext Transfer Protocol (HTTP), the connection determining unit 54 in the modification (1) determines whether the details of communication based on HTTP include information unique to a particular type of network (such as the NGN 30). Alternatively, the connection determining unit 54 may determine whether a response to a given HTTP request to the home gateway of the NGN 30 has been received. In this case, a signal indicating a response to the HTTP request corresponds to the unique information.

When the details of communication based HTTP include information unique to a particular type of network (such as the NGN 30), the communication controller 56 controls communication of the first physical interface 22 or the second physical interface 24 on the basis of network setting information corresponding to the particular type of network. Upon receipt of a response to a given HTTP request to the home gateway of the NGN 30, the communication controller 56 controls communication of a physical interface on the basis of the network setting information for the NGN 30.

According to the modification (1), the type of network is specified on the basis of information obtained based on HTTP.

(2) The exemplary embodiment has described the case in which whether the image forming apparatus 10 is connected to the NGN 30 is determined by referring to a packet addressed to the image forming apparatus 10. Alternatively, this determination may be performed by referring to a packet addressed to another node.

The communication controller 56 in the modification (2) obtains the details of communication with another node different from a node to which a physical interface (such as the first physical interface 22 or the second physical interface 24) belongs. The communication controller 56 obtains a packet being broadcast. The connection determining unit 54 determines whether the details of communication with the different node include information unique to the NGN 30.

When the details of communication with the different node include information unique to a particular type of network (such as the NGN 30), the communication controller 56 controls communication of the first physical interface 22 or the second physical interface 24 on the basis of the network setting information corresponding to the particular type of network.

According to the modification (2), communication control is performed using the details of communication with the different node.

(3) The above-described modifications may be combined. For example, the modification (1) and the modification (2) may be combined. In this case, it is determined that the image forming apparatus 10 is connected to the NGN 30 when a response to an HTTP request is sent in the different node.

Alternatively, an IP address may be obtained without using DHCP. For example, an IP address in the IPv6 format may be dynamically generated on the basis of the prefix of a stateless address obtained from a router connected to the NGN 30 and the MAC address of the first physical interface 22 or the second physical interface 24. Further, only one physical interface may be included in the image forming apparatus 10. Also, for example, the information processing apparatus according to the exemplary embodiment of the invention is applicable to a computer different from the image forming apparatus.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a physical interface that communicates with any of a plurality of types of networks;

a memory that stores a relationship between the physical interface and network setting information corresponding to one of the plurality of types of networks;

a determining unit that, when information unique to a particular type of network, among the plurality of types of networks, is obtained via the physical interface, determines whether the network setting information included in the stored relationship corresponds to the particular type of network; and a communication controller that controls communication of the physical interface on the basis of the network setting information included in the stored relationship, wherein when the determining unit determines that the network setting information included in the stored relationship does not correspond to the particular type of network, the communication controller replaces the network setting information included in the stored relationship with network setting information corresponding to the particular type of network.

2. The information processing apparatus according to claim 1, wherein the information processing apparatus further comprises a second physical Interface, wherein the memory further stores a second relationship between the second physical interface and network setting information corresponding to one of the plurality of types of network, wherein the communication controller replaces the network setting information included in the stored relationship with the network setting information corresponding to the particular type of network independent of the network setting information included in the stored second relationship.

3. The information processing apparatus according to claim 1, wherein the particular type of network is a next generation network (NGN), and wherein, when NGN unique information is obtained via the physical interface and the determining unit determines that the network setting information included in the stored relationship does not correspond to the NGN, the communication controller replaces the network setting information included in the stored relationship with network setting information corresponding to the NGN.

4. The information processing apparatus according to claim 1, wherein a Dynamic Host Configuration Protocol (DHCP) server is connected to each of the plurality of types of networks, and wherein the physical interface communicates with the DHCP server of any of the plurality of types of networks.

5. The information processing apparatus according to claim 1, wherein the physical interface performs communication based on the Hypertext Transfer Protocol (HTTP), and wherein, when details of communication based on the HTTP include information unique to the particular type of network and the determining unit determines that the network setting information included in the stored relationship does not correspond to the particular type of network, the communication controller replaces the network setting information included in the stored relationship with network setting information corresponding to the particular type of network.

6. The information processing apparatus according to claim 1, wherein the communication controller includes a unit that obtains details of communication with another node different from a node to which the physical interface belongs, and, when the obtained details of communication with the different node include information unique to the particular type of network and the determining unit determines that the network setting information included in the stored relationship does not correspond to the particular type of network, the communication controller replaces the network setting information included in the stored relationship with network setting information corresponding to the particular type of network.

7. A non-transitory computer readable medium storing a program causing a computer to execute a process, the process comprising:

obtaining, from a memory, a stored relationship between a physical interface and network setting information corresponding to one of a plurality of types of networks;

determining, when information unique to a particular type of network, among the plurality of types of networks, is obtained via the physical interface, whether the network setting information included in the stored relationship corresponds to the particular type of network controlling communication of the physical interface on the basis of the network setting information included in the stored relationship; and replacing, when the determining determines that the network setting information included in the stored relationship does not correspond to the particular type of network, the network setting information included in the stored relationship with network setting information corresponding to the particular type of network.

8. An image processing method comprising:

obtaining, from a memory, a stored relationship between a physical interface and network setting information corresponding to one of a plurality of types of networks;

determining, when information unique to a particular type of network, among the plurality of types of networks, is obtained via the physical interface, whether the network setting information included in the stored relationship corresponds to the particular type of network controlling communication of the physical interface on the basis of the network setting information included in the stored relationship; and replacing, when the determining determines that the network setting information included in the stored relationship does not correspond to the particular type of network, the network setting information included in the stored relationship with network setting information corresponding to the particular type of network.

* * * * *